Oct. 8, 1963

H. A. STOVER 3,106,710

AUTOMATIC DIRECTION FINDER RECEIVER

Filed June 7, 1961

INVENTOR.
HARRIS A. STOVER

BY
ATTORNEYS

Oct. 8, 1963          H. A. STOVER                3,106,710
           AUTOMATIC DIRECTION FINDER RECEIVER
Filed June 7, 1961                        6 Sheets-Sheet 2

FIG 2

INVENTOR.
HARRIS A. STOVER
BY Moody and Phillips
ATTORNEYS

Oct. 8, 1963  H. A. STOVER  3,106,710
AUTOMATIC DIRECTION FINDER RECEIVER
Filed June 7, 1961  6 Sheets-Sheet 4
FIG 4
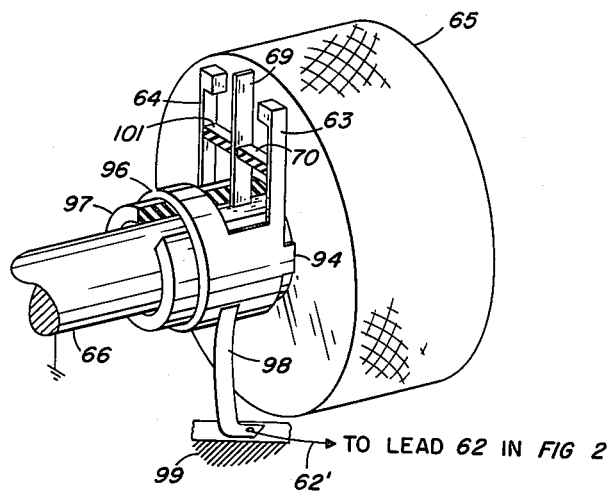
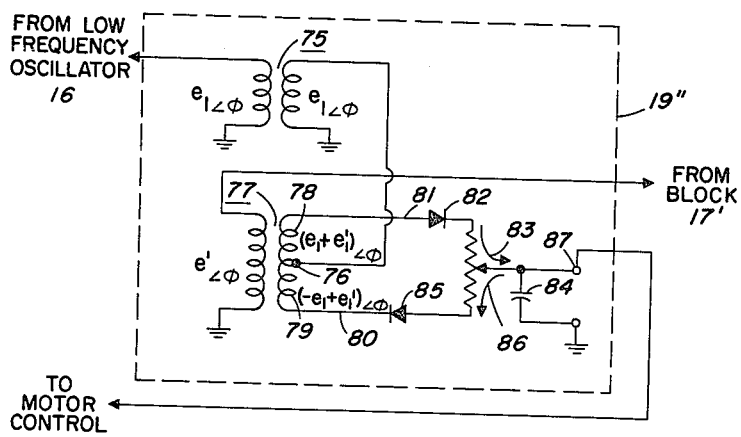
FIG 5
INVENTOR.
HARRIS A. STOVER
BY *Moody and Phillior*
ATTORNEYS

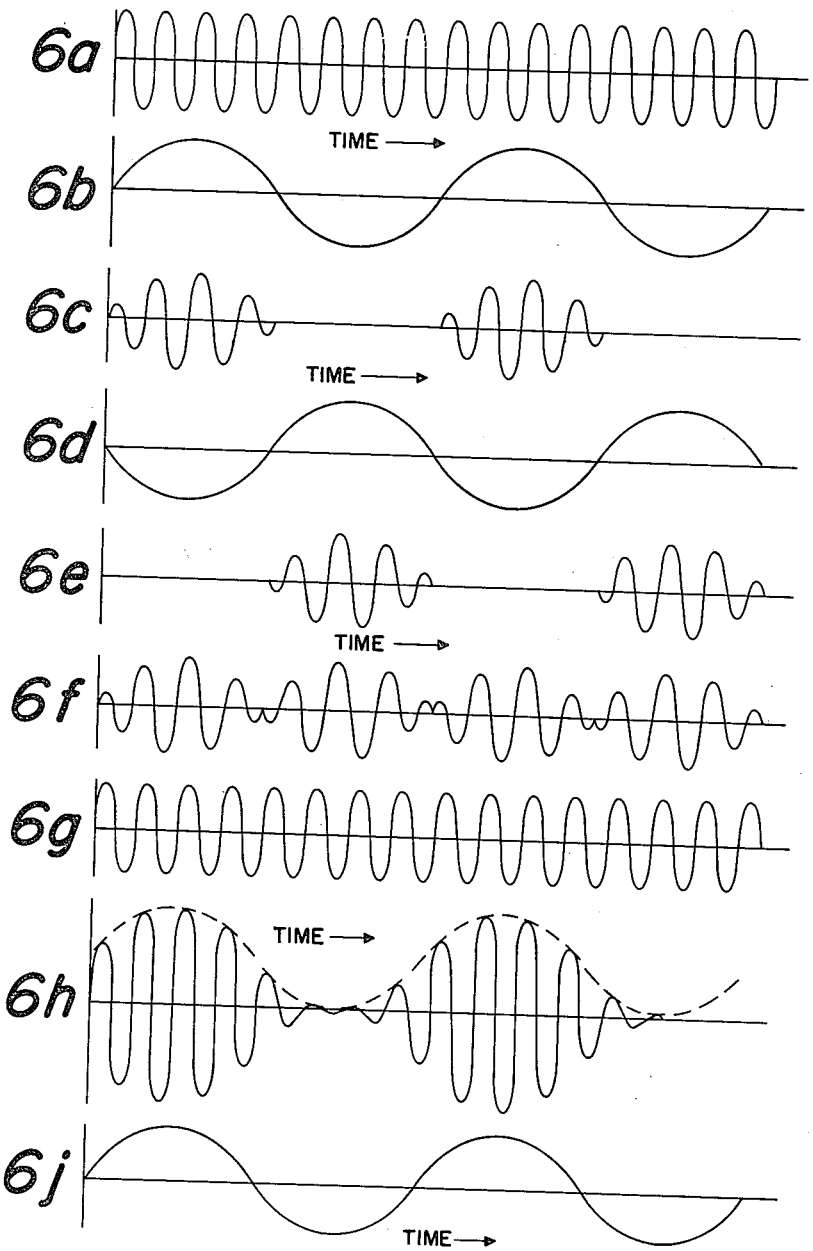

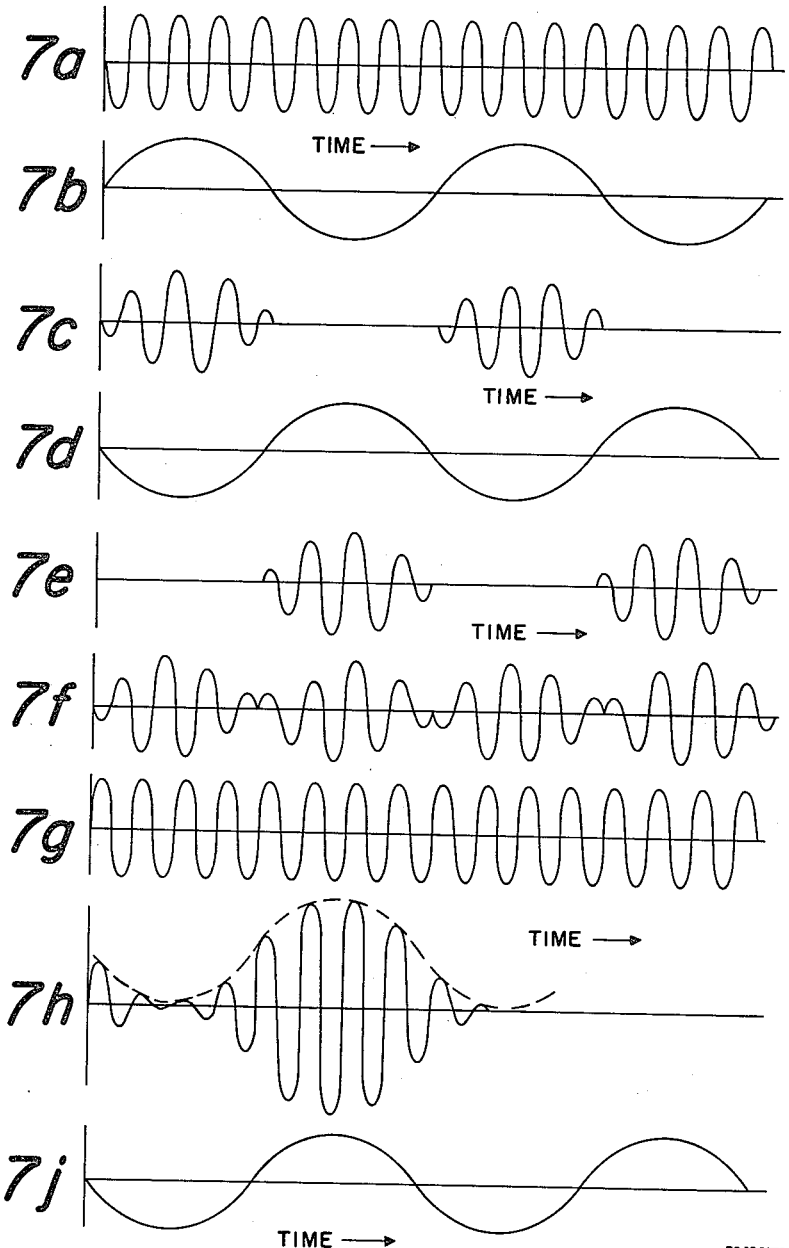

United States Patent Office 3,106,710
Patented Oct. 8, 1963

3,106,710
AUTOMATIC DIRECTION FINDER RECEIVER
Harris A. Stover, Cedar Rapids, Iowa, assignor to Collins Radio Company, Cedar Rapids, Iowa, a corporation of Iowa
Filed June 7, 1961, Ser. No. 115,409
9 Claims. (Cl. 343—117)

This invention relates generally to automatic direction finder receivers (ADF) employing a rotatable inductive type loop antenna, and a capacitive sense antenna and, more particularly, to an ADF receiver in which a second sensing antenna of the inductive loop type is employed in cooperation with the capacitive sense antenna to provide a more reliable and sensitive ADF receiver.

In the prior art there are several types of ADF receivers. One such prior art ADF receiver employs a rotatable inductive loop which produces a signal when a component of the plane of a loop is perpendicular to the magnetic field of the received radiation. The voltage generated in the goniometric loop under these conditions is employed to drive a servo motor which will be energized until said goniometric loop antenna finds a null, i.e., a position whereby its plane is parallel with the magnetic field of the radiation so that no voltage is induced in said loop. Owing to the fact that there is no reference signal which can be compared with the received signal to command the direction of rotation of the servo motor, it is apparent that the inductive loop antenna can find a null in either of two positions, said positions being 180° removed from each other. In order to supply the reference signal needed to resolve such ambiguity, a capacitive sense antenna has been employed in the prior art. As will be explained in some detail later, the phase of the signal received by the capacitive sense antenna will constitute the reference phase and is employed to resolve the ambiguity inherent in the rotatable inductive loop. The relationship of the phases of the signal generated in the inductive loop antenna and the phase of the signal received by the sensing antenna are compared by appropriate circuit means which produces a signal of proper polarity whereby the servo motor is caused to rotate in the proper direction to rotate the rotatable loop to the proper null.

Under certain circumstances the prior art exhibits certain disadvantages. For example, in aircraft there exist electrical disturbances in and around the aircraft as, for example, noise from brush generators and corona effects of the wing which produce radiation. Since the near electrical field of radiating sources is very large compared to the near magnetic field, the capacitive sense antenna is strongly affected by such locally generated noise. Furthermore, the capacitive sensing antenna is an omnidirectional type antenna and, consequently, has no directivity characteristic by which much of the noise would otherwise be eliminated. On the other hand, an inductive loop antenna which is activated by the magnetic field would function much more effectively than the capacitive antenna as far as local noise is concerned. Such a loop sensing antenna can be secured to the same rotatable mount as the goniometric loop antenna, but physically spaced in a plan 90° from the plane of said goniometric loop antenna. Thus, when the rotatable loop or goniometer finds, or is near a null, the voltage generated in the loop sensing antenna will be at a maximum. Thus, it can be seen that the use of a loop sensing antenna, which is responsive to the magnetic field rather than the electrical field has the advantage of not being affected by the relatively intense electrical fields of local noises and, further, has the advantage of directivity so that noises emanating from directions outside the path of directivity will have a much smaller effect thereupon than such noise would have upon the capacitive sense antenna.

However, the use of a loop type inductive sense antenna would still have the inherent disadvantage of not being able to differentiate between the two nulls of the rotatable loop antenna (goniometer). It would mark a definite improvement in the art to combine the noise eliminating properties of the inductive sense antenna with the ambiguity resolving characteristics obtainable by a capacitive type sense antenna in an ADF system.

It is an object of the present invention to combine a loop inductive sense antenna with a capacitive sense antenna in an ADF system whereby the advantages of both types of sense antennas are utilized.

A further object of the invention is an ADF system which is relatively free of locally generated electrical disturbances.

A third object is to provide an ADF system which is particularly useful in aircraft.

A fourth object of the invention is the improvement of ADF systems, generally.

In accordance with the invention there is provided a goniometer comprised of a rotatable loop antenna and a stationary capacitive type sensing antenna which may simply be a whip antenna. A second loop antenna is mounted at right angles to the goniometer and upon the same rotatable base so that the goniometer and the second loop antenna, which is a sensing antenna, rotate together. Circuit means, including a servo means, are provided to compare the phases of the signal received by the goniometer and by the capacitive type sensing antenna to produce a control signal which will energize a servo motor which, in turn, will rotate the goniometer to the proper null. Other circuit means, including a phase detector, respond to the condition wherein the goniometer has found the proper null to operate a switching means which disconnects the capacitive type sensing antenna from the ADF system and connects the loop type inductive sensing antenna into the system. Thus the operating characteristics of the capacitive sensing antenna will enable the goniometer to find the proper null and the aforementioned phase detector will respond to said null condition to produce an output signal level which will cause said switching means (which can be a relay) to disconnect said sensing antenna from the ADF system and to connect the loop type inductive sensing antenna into the system. Since the goniometer is at this time at the proper null, the loop type sensing antenna will not be required to find the proper null, but only to maintain the already found proper null.

In accordance with a feature of the invention there is provided a tuning mechanism which, when actuated, operates means for energizing the said switching means so that the capacitive sense antenna will be connected into the ADF system and the loop sensing antenna will be disconnected therefrom. The relay solenoid which controls the switches will remain energized to maintain such a condition of said switching means until the goniometer finds the proper null, at which time the relay winding will become de-energized, thus disconnecting the capacitive sense antenna from the circuit and connecting the inductive loop sense antenna into the circuit.

The above mentioned and other objects and features of the invention will be more fully understood from the following detailed description thereof, when read in combination with the drawings in which:

FIG. 2 is a combination block diagram and a schematic sketch of the invention;

FIG. 2a shows the operating characteristics of a loop type antenna;

FIG. 4 shows a combination switch and turning knob which may be employed in the invention;

FIG. 5 shows a schematic diagram of a phase detector which may be employed in FIG. 2; and FIGS. 6a through 6j, and FIGS. 7a through 7j show curves of the voltage waveform existing at various points in the circuit and funciton as an aid in understanding how the phases of the received signals are compared to produce a proper control signal for the servo motor which drives the goniometer.

Figure 1:
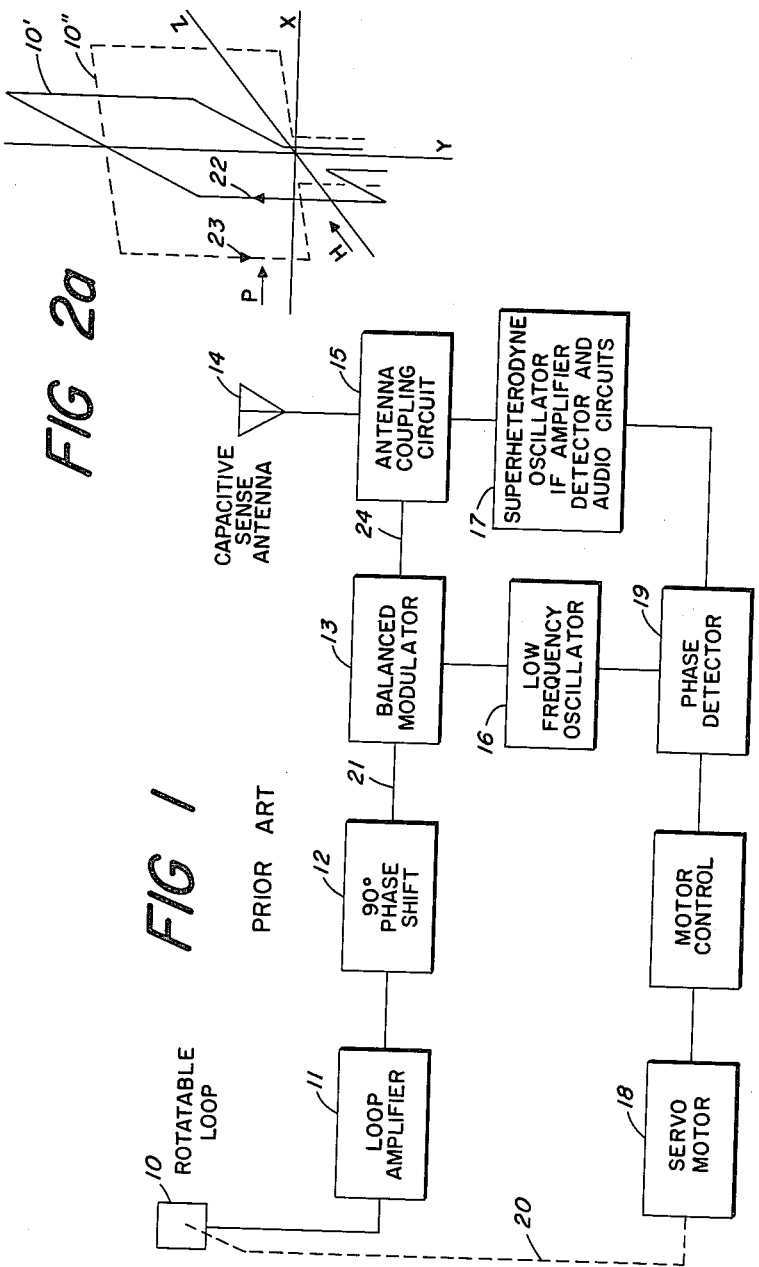
FIG. 1 is a block diagram of a prior art ADF system employing a goniometer and a capacitive sense antenna.

Referring now to the prior art structure shown in FIG. 1 the rotatable loop antenna 10 is constructed to be sensitive only to magnetic fields. This can be accomplished by the simple expedient of shielding the conductor of the antenna by copper tubing, for example. The dotted line 20 represents a mechanical coupling to the servo motor 18, which in response to a signal supplied thereto will tend to drive the antenna 10 to the proper one of the two possible nulls. The output signal of the antenna 10 is supplied to a circuit comprising an amplifier 11, and a 90° phase shift circuit 12, and a balanced modulator circuit 13 arranged in cascade. It should be noted at this time that the 90° phase shift circuit 12 is required to compensate for the 90° phase shift introduced in the received signal by the inductive loop antenna 10. As will be seen later, it is desired that the signal intercepted by the loop antenna 10 be either in phase or 180° out of phase with the signal intercepted by the sense antenna 14. The 90° phase shift circuit 12 obtains such a desired phase relationship.

Such in-phase or 180° out-of-phase relationship of the two received signals is determined by which of its two possible nulls the rotatable loop 10 assumes. To further clarify this point, reference is made to FIG. 2a wherein the rotatable antenna 10' is shown positioned on one side of the null plane, which is the y—z plane. Under these conditions the direction of current flow in the loop antenna is represented by the arrow 22. The vector H represents the instantaneous direction of the magnetic field and the vector P represents the direction of propagation of the electromagnetic wave. If now the antenna 10' is rotated to the position shown by the dotted representation 10", the current flow therein will be reversed and will be in a direction indicated by the arrow 23. When the rotatable antenna lies in the y—z plane, there will, of course, be no voltage induced in the rotatable antenna since there is no magnetic flux therethrough and, consequently, no rate of change of flux therein.

The waveform of FIG. 6a represents the signal generated in antenna 10" which is to the right of the true null position. The waveform shown in FIG. 7a represents a signal generated in a dotted antenna representation 10', which is to the left of the true null position. It will be observed that the phase of the waveform shown in FIG. 6a is 180° removed from the phase of the figure shown in FIG. 7a, the time scale in each of the two figures being the same.

For purposes of operation assume that the antenna 10 is to the right of the true null position, as shown by the representation of 10" of FIG. 2a. From the explanation under the above assumed condition much of the operation of the circuit when the loop antenna is to the left of the true null condition will become apparent.

The low frequency oscillator 16 supplies a signal as represented by the waveform of FIG. 6b to a first half of the balanced modulator 13. During the positive one-half cycle of the waveform of FIG. 6b there is produced at the output of modulator 13 an output signal consisting of the modulated waveform of FIG. 6a and having the same phase thereas. Such modulated signal is represented by the waveform of FIG. 6c. During the negative half-portion of the waveform of FIG. 6b the first half of the balanced modulator 13 is cut off and produces no output signal. FIG. 6d represents the output signal from the low frequency oscillator 16 which is supplied to the second half of the balanced modulator. Here, again, during the negative half cycle of the low frequency signal shown in FIG. 6d, the balanced modulator 13 is cut off and produces no output signal. The waveforms of FIG. 6c and 6e are combined in the output circuit of the balanced modulator 13 to produce the waveform shown in FIG. 6f. It will be observed that due to the characteristics of the modulator 13, the phase of the waveform FIG. 6e is shifted 180° with respect to the waveform of FIG. 6c. In FIG. 6g there is shown the waveform of the signal received by the sense antenna 14, which signal has a constant phase regardless of the position of the sense antenna 14. The signals of FIG. 6g and FIG. 6f are combined in the antenna coupling circuit 16 to produce the resultant waveform shown in FIG. 6h. Such resultant waveform is then detected and the upper modulation envelope extracted therefrom by the circuit within the block 17 to produce at the output terminal of the detector 17 a signal having a waveform as shown in FIG. 6j. It will be observed that the waveform of FIG. 6j has the same phase as the wareform of FIG. 6b, which last-mentioned waveform represents the output signal of the low frequency oscillator 16.

The two signals shown in FIG. 6b and FIG. 6j are supplied to phase detector 19 where their phases are compared. Phase detector 19 is of the type which will produce a D.C. signal of a first polarity if the phases of the two signals are the same and will produce a D.C. signal of the opposite polarity if the phases of the two signals are 180° apart. The polarities of such D.C. output signals of the phase detector 19, which are supplied to servo motor 18, are such that they will drive the servo motor in the proper direction to rotate the rotatable loop 10 to the true null.

In the specific example assumed herein (the loop 10 having the position represented by loop 10" in FIG. 2a) the servo motor 18 will cause the loop 10" of FIG. 2a to rotate in a counterclockwise direction so as to become aligned with the y—z plane. It should perhaps be noted at this point that if the loop in FIG. 2a were to the left of the true null (i.e., in the position of loop 10'), the output signal from the phase detector 19 would be of a polarity such that the servo motor 18 will drive the loop 10' in a clockwise direction towards the true null position. Such a condition will be described with the aid of waveforms 7a through 7j.

Once the rotatable loop 10 becomes positioned in the y—z plane of FIG. 2a, there will be no voltage induced therein and, consequently, the voltage represented in FIGS. 6a, 6c, 6e, and 6f, will become zero so that the waveform of 6h will be simply that of 6g, which will result in no signal at the output terminals of the circuit of the block 17.

Assume now, as the second possible condition of the rotatable loop 10, that it is positioned to the left of the true null, as shown by the representation 10' of FIG. 2a. The voltage induced in the loop 10' will then be represented by the waveform of FIG. 7a, FIGS. 7b and 7d represent the signals supplied to the two halves of the balanced modulator 13 from the low frequency oscillator 16, and the waveforms of FIGS. 7c and 7e represent the modulated waveforms produced in each half section of the modulator 13. Waveform 7f represents the composite output of the modulator 13. The waveforms of FIGS. 7g and 7f are then combined in the coupling circuit 15 to produce the waveform of FIG. 7h. From the coupling circuit 15, the waveform of FIG. 7h is supplied to detector 17 which responds thereto to produce the waveform of FIG. 7j, which waveform, it will noted, is 180° out of phase with the waveform of FIG. 7b, which is supplied to the first half of the balanced modulator 13. The waveform of FIG. 7b is supplied to phase detector 19 along with the waveform of FIG. 7j where their phases are compared as indicated hereinbefore. Phase detector 19 is constructed to respond to the signals of FIGS. 7b and 7j to produce a D.C. voltage output of a polarity such as to cause the servo motor 18 to drive the loop 10' in a clockwise direction towards the true null position.

It is to be specifically noted that in the case where the antenna loop is to the right of the null plane y—z, as represented by dotted loop 10'' of FIG. 2a, that the phases of the low frequency oscillator signal output and the output of the block 17, as shown in the waveforms of FIGS. 6b and 6j, are the same. On the other hand, however, when the antenna loop is to the left of the y—z plane, as represented by the loop 10' of FIG. 2a, the phases of the low frequency oscillator 16 output and the output signal of block 17 are 180° out of phase, as represented by the waveforms of FIGS. 7b and 7j. It is this difference in the phase relationship between the output signal of the low frequency oscillator 17 and the output signal of detector 17 that resolves the ambiguity of which direction the antenna loop should be rotated in order to attain the proper null position.

Referring now to the structure of FIG. 2, there is shown a preferred embodiment of the invention. It is to be understood that the detailed descriptive material relating to FIG. 1 has been of prior art structure.

In FIG. 2, a second sensing antenna 43 has been added. This second sensing antenna 43, which is an inductive loop-type antenna, is connected to the same rotatable base 44 as the goniometer loop 10'''. A pair of connections 45 connect the sensing loop antenna 43 to a pair of contacts 46 and 42. It is to be noted that such contacts form a part of a double-pole, double-throw switch which is actuated by solenoid 47. A second pair of stationary contacts 48 and 90 and two movable contacts 49 and 91 complete the double-pole, double-throw switch. A similar set of switches 50 and 51 function, under the proper circumstances to be described later, to remove the 90° phase shift circuit 12' from the ADF system and to supplant it with direct connecting means 52.

During the time the rotatable loop 10''' is seeking the proper null position the relay winding or solenoid 47 is energized by signal means, which will be described later herein, so that movable contacts 49 and 91 make with stationary contacts 90 and 48 and switches 50 and 51 are closed to connect the 90° phase shift circuit 12' into the circuit. The capacitive antenna 14' will then be connected into the circuit and the inductive loop sense antenna 43 will be disconnected from the circuit so that the system will function exactly as the system shown in FIG. 1, with the following exception. Such exception is that the relay 47, which is not present in FIG. 1, is caused to be energized in a circuit extending from ground through the tuning knob 54, relay winding 47 to the output terminal 55 of the phase detector 19'. Such output terminal 55 will have either a positive or a negative D.C. voltage thereon since the goniometer 10''' is assumed to be not in a null position. It should be noted at this point that the tuning knob switch 54 is constructed to connect the relay winding 47 to ground any time that the knob is rotated; the connection to ground being removed through the tuning knob switch upon cessation of the rotating motion of the knob. This means that any time the operator tunes the superheterodyned circuit 17' to a new frequency, the goniometer 10''' will in all likelihood not be at the proper null position and, consequently, a D.C. voltage will appear at the output terminal 55 of detector 19'. Such D.C. voltage causes energization of the slow-to-release relay 47 to cause a closing of contact arms 91 and 49 upon contacts 90 and 48 and a closing of switches 50 and 51 to place phase shifter 12' in the circuit. Due to the holding circuit through contacts 59, the relay 47 will remain energized as long as there is an error voltage on the output terminal 55 of the phase detector 19'. When the proper null position is obtained by the goniometer 10''' the D.C. error voltage on terminal 55 will become zero and the relay 47 will become de-energized. The relay 47 is selected to be a slow-to-release relay in order to insure a sufficient time interval for the receiver to become fully tuned to the new station. Upon de-energization of the relay 47, the movable contacts 91 and 49 will break with contacts 90 and 48 and will make with contacts 46 and 42, thus disconnecting capacitive sensing antenna 14' from the circuit and connecting the inductive sensing antenna 43 into the circuit. Additionally, the phase shift circuit 12' will be disconnected from the circuit and loop amplifier 11' will be connected directly to the balanced modulator 13' through conductor 52. At this time the goniometer 10''' has found the proper null and the sensing antenna is now the inductive loop antenna 43, which is positioned to have a maximum voltage induced therein since it is at right angles with the goniometer 10'''. From this point the antenna 43 will perform the function of maintaining the goniometer 10''' at the proper null position until the tuning knob 54 is turned to a new position.

There will be many occasions when the pilot of an aircraft will have sufficient awareness of his position to know which of the two null positions of the goniometer 10''' is correct. Under these circumstances, he may find it unnecessary to use the capacitor sense antenna 14'. Since the 180° ambiguity is resolved by personal knowledge of the situation, all the pilot needs to know is the direction of the line joining his plane and the source antenna. Such a line can be obtained solely with the use of the goniometer 10''' and the loop antenna 43. It might be appropriate to point out the loop antenna 43 is needed, not to resolve 180° null position ambiguity, but only to determine in which direction the goniometer 10''' is rotated off the true null position (which has already been established).

In order to remove the capacitive antenna 14' from the circuit during manipulation of the tuning knob 54, a manually operable switch 60 is provided which will disable relay 47 regardless of what is done with knob 54. A second manual switch 100 is provided to permit the operator to connect capacitive sense antenna 14' into the ADF receiver without turning knob 54.

Figure 3:
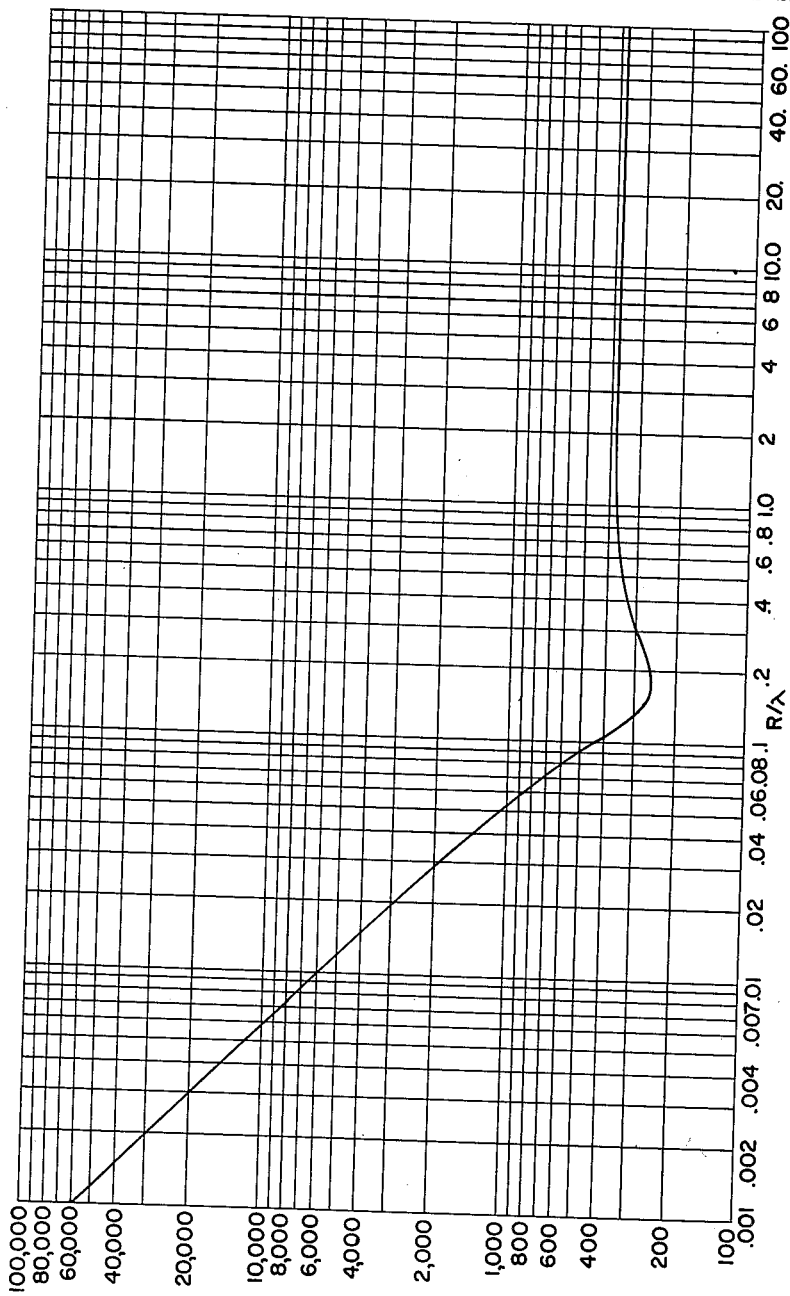
FIG. 3 is a chart showing the relationship of the ratio of electrical field strength to magnetic field strength vs. distance from a dipole signal source and in a plane normal to and bisecting said dipole.

Referring now to FIG. 3, there is shown a curve illustrating the ratio of the magnitude of the near electrical field to the near magnetic field, with respect to distance, along the perpendicular bisector of a short dipole generating source which could simulate a noise source. The abscissa is scaled in accordance with $$\frac{R}{\lambda}$$

where R is the actual distance between the noise source and the sense antenna and $\lambda$ is the wavelength of the noise signal. Since the ADF contains a tuned receiver, the wavelength of the noise receiver must necessarily fall within the tuned bandwidth of the receiver. To illustrate the great improvement in signal-to-noise ratio that may be obtained with the loop antenna 43, consider the following specific example. Assume that the mid-frequency of the bandwidth through which the receiver is being tuned is 300 kilocycles. Under these conditions the wavelength is 10000 meters. If a noise source, such as might be created by a generator brush, is located five meters from a sensing antenna, the ratio $$\frac{R}{\lambda}$$

is equal to 5/1000 or .005. Referring now to the chart of FIG. 3, it will be seen that the ratio $$\frac{E}{H}$$

is 12,000. Further, from the chart it can be seen that at large distances from the source the ratio of $$\frac{E}{H}$$

is about 377. Thus, it is apparent that the improvement in signal-to-noise ratio obtained by using the loop 43 rather than the capacitive antenna 14' for a noise source 5 meters away is $$\frac{12,000}{377}$$

or about 50 db.

Referring now to FIG. 4, there is shown therein a tuning knob arrangement which can be utilized in the invention. The structure of FIG. 4 is shown in perspective. A member 96 which contains contacts 63 and 64 is rigidly connected to the knob 65 by suitable means, such as key 94. Insulative means 97 is interpositoned between the member 96 and the shaft 66 so as to electrically isolate the two members from each other. The knob 65, the conductive member 96, and the insulative ring 97 are all rigidly connected together and free to rotate on grounded shaft 66. A brush 98 makes sliding contact with member 96 and is secured to a firm foundation 99. Conductive finger 69 is rigidly connected to the grounded shaft 66 and is positioned between the two rigid contact members 64 and 63. Elements 101 and 70 of elastic material, such as rubber or other suitable material are positioned between the rigid contact members 63 and 64 and the rigid finger 69. When the knob 65, which is of insulative material, is rotated, the knob will move freely on the shaft 66 until one of the rigid contacts 63 or 64 makes with the rigid finger 69 and causes the shaft 66 to rotate. In addition to causing the shaft 66 to rotate, a ground connection is applied to the lead 62' in a circuit extending from ground to the shaft 66, finger 69, one or the other of the contacts 63 or 64 to the lead 62', which lead is also shown in FIG. 2. Thus, the relay 47 of FIG. 2 will be energized, assuming a potential on the output 55 of phase detector 19' of FIG. 2. When the operator releases the knob 55, the spring-like elements 101 and 70 will function to locate the rigid finger 69 midway between the contacts 63 and 64, thus removing ground from the lead 62'.

In FIG. 5 there is shown a phase detector which can be employed in block 19' of FIG. 2 of the invention. This phase detector is of the type whereby a D.C. signal of a first polarity is produced if the two signals being compared are in phase and a D.C. voltage of the opposite polarity if the two signals are 180° out of phase.

In the circuit of FIG. 5 the output from the low frequency oscillator 16 is supplied to the primary winding of the transformer 75 and is designated as $$e_1 \angle \phi$$

which is a notation meaning as signal $e_1$, having a phase angle $\phi$. The transformer 75 is wound so that the output voltage produced in the secondary winding also has an angle $\phi$. The phase of $e_1$ provides a reference for the signal supplied from the block 17 of FIG. 2. The said signal supplied from the block 17 of FIG. 2 is designated $$e'_1 \angle \phi$$

and, as discussed hereinbefore, may be either in phase with the signal from oscillator 16 or 180° out of phase therewith. In the specific example shown in FIG. 5 assume that the two signals are in phase. The secondary winding of transformer 75 is connected to the tap 76 of the secondary winding of transformer 77. The primary and secondary windings of transformers 77 are wound so that under these circumstances the signals $e_1$ and $e'_1$ are in phase in the upper half winding 78 of the secondary winding of transformer 77 and the 180° out of phase in the lower half winding 79 of said secondary winding. Thus, substantially, no voltage appears on the lead 80 and a large voltage appears on the lead 81. The diode 82 functions to rectify such signal to produce a D.C. current flowing in the direction of the arrow 83. Capacitor 84 functions as a filter element so that the voltage at point 87 is substantially D.C.

Assume now the condition where the phase of the signal $e'_1$ is 180° out of phase with the signal $e_1$ from oscillator 16. Under this condition the two signals would be in phase in the lower half winding 79 of the secondary winding of transformer 77 and would oppose each other in the upper half winding 78 of said secondary winding. Thus, substantially no signal would appear on lead 81, whereas a large signal would appear on conductor 80. The diode 85 would function to produce a current represented by arrow 86. This current 86 is poled oppositely to the current 83 and, consequently, would produce a D.C. potential of opposite polarity across the capacitor 84. The terminal 87 merely represents the output terminal which is connected to the motor control blank of FIGS. 1 and 2.

It is to be noted that the form of the invention shown and described herein is but a preferred embodiment thereof and that various changes may be made in circuit arrangement and detailed circuit structure without departing from the spirit or the scope of the invention.

I claim:

1. An automatic direction finder receiver comprising a rotatable loop goniometer, a capacitive sense antenna, circuit means for comparing the phases of the signals intercepted by said loop goniometer and said capacitive sense antenna when said capacitive sense antenna is electrically connected to said circuit means to provide an output signal having a characteristic which is indicative of the relative position of said goniometer and the direction of propagation of the received signal, servo means constructed and arranged to be responsive to said output signal to rotate said goniometer to the correct null position with respect to the received signal, inductive loop sensing antenna means arranged in space quadrature with said loop goniometer, first switching means constructed to connect said capacitive sense antenna to said circuit means, said switching means further being constructed to respond to the null position of said goniometer to disconnect said capacitive sense antenna from the automatic direction finder receiver and to connect said inductive loop sense antenna into said automatic direction finder receiver in lieu of said capacitive sense antenna.

2. An automatic direction finder receiver in accordance with claim 1 comprising an energizing circuit for said first switching means and tuning means for tuning said receiver to different frequency bandwidths, said tuning means including second switching means which is constructed to respond to rotation of said tuning knob to complete the energizing circuit for said first switching means, said first switching means being constructed to respond to said output signal when said energizing circuit is completed to disconnect said inductive loop sensing antenna from the automatic direction finder receiver and to connect said capacitive sense antenna into automatic direction finder receiver in lieu of said inductive loop sensing antenna.

3. An automatic direction finder receiver in accordance with claim 2 comprising a holding means to hold said energizing circuit in a completed state until a null position is reached by said goniometer and said output signal decreases below a predetermined minimum value.

4. An automatic direction finder receiver comprising a rotatable loop goniometer, a capacitive sense antenna, a 90-degree phase shifting circuit constructed and arranged to shift the phase of the signal received by said goniometer by 90°, low frequency oscillator means constructed to generate a signal whose frequency is low compared to the carrier frequency of the received signal, balanced modulator means responsive to the output signals of said 90° phase shifting circuit and said low frequency oscillator to produce an output signal consisting of the received signal modulated by the low frequency oscillations and in which the phase of the received signal component is reversed 180° each half cycle of the output signal of the low frequency oscillator, signal adding means for adding the output of said balanced modulator and the received signal intercepted by said capacitive sense antenna to produce an output signal having an upper and a lower envelope of the frequency of said low frequency oscillator output signal, detector means for detecting a given one of said envelopes of the output signal of said signal adding means, phase detector means responsive to the output signal of said low frequency oscillator and the output signal of said detector means to produce a D.C. voltage whose polarity is representative of the relative position of said goniometer and the direction of propagation of the signal intercepted, servo means responsive to the output of said phase detector to rotate said goniometer to its proper null position with respect to the received signal, an inductive loop sense antenna arranged in space quadrature with said goniometer and further constructed to rotate with said goniometer so as to always remain in space quadrature relation therewith, relay means including a winding and switching means constructed to be responsive to the output signal of said phase detector means when said goniometer is positioned in its null position to disconnect said capacitive sense antenna from the automatic direction finder receiver to connect said inductive loop antenna into said automatic direction finder receiver in lieu of said capacitive sense antenna, and to bypass said 90° phase shifting circuit, and means responsive to the tuning of said receiver to a different frequency bandwidth to cause said relay means to disconnect said inductive loop sense antenna from said automatic direction finder receiver, to connect said capacitive sense antenna to said automatic direction finder receiver in lieu of said inductive loop sense antenna, and to connect the 90° phase shifting circuit into the automatic direction finder receiver.

5. An automatic direction finder receiver in accordance with claim 4 comprising an energizing circuit for said relay winding and in which said means responsive to said tuning means comprises a tuning knob and at least a pair of contacts responsive to the rotation of said tuning knob to make with each other to complete said energizing circuit for said relay winding, said relay winding being responsive to an output signal from said phase detector when the energizing circuit for the relay winding is completed to become energized to disconnect said inductive loop sense antenna from said automatic direction finder receiver, to connect said capacitive sense antenna to said automatic direction finder receiver in lieu thereof, and to connect said 90° phase shifting circuit into the automatic direction finder.

6. An automatic direction finder receiver in accordance with claim 5 comprising a holding circuit for said relay winding, said relay winding remaining energized until a null position is reached by said goniometer and said output signal decreases below a predetermined minimum value.

7. An automatic direction finder receiver comprising a rotatable loop goniometer for receiving a radiated signal, a capacitive sense antenna, phase shifting means for shifting said received signal 90°, low frequency oscillator means constructed to generate a signal whose frequency is low compared to the carrier frequency of the received signal, balanced modulator means responsive to the output signal of said phase shifting circuit and the output signal of said low frequency oscillator to produce an output signal consisting of a sideband of said received signal modulated by the output of the low frequency oscillator, antenna coupler means for adding said sideband and the signal received by said capacitive sense antenna to produce a signal in which the carrier of the received signal has been reinserted and having an upper and lower envelope of the frequency of the output signal of said low frequency oscillator, detector means responsive to the output of said antenna coupler to extract the upper envelope therefrom, phase detector means responsive to the output signal of said low frequency oscillator and the output signal of said detector means to produce a direct current voltage whose polarity is representative of the relative position of said goniometer and the direction of propagation of the signal intercepted, servo means responsive to the output of said phase detector means to rotate said goniometer to its proper null position, an inductive loop sense antenna arranged in space quadrature with said goniometer and further constructed to rotate with said goniometer so as to always remain in space quadrature relation therewith, relay means including a winding and switching means constructed to be responsive to the output signal of said phase detector means when said goniometer is positioned in its null position to disconnect said capacitive sense antenna from the automatic direction finder receiver, to connect said inductive loop antenna into said automatic direction finder receiver in lieu of said capacitive sense antenna and to bypass said phase shifting means, and means responsive to the tuning of said automatic direction finder receiver to a different frequency bandwith to cause said relay means to disconnect said inductive loop sense antenna from said automatic direction finder receiver, to connect said capactive sense antenna to said automatic direction finder receiver in lieu of said inductive loop sense antenna, and to connect said phase shifting means into the automatic direction finder receiver.

8. An automatic direction finder receiver in accordance with claim 7 comprising an energizing circuit for said relay winding and in which said means responsive to said tuning of said automatic direction finder receiver comprises a tuning knob and at least a pair of contacts responsive to the rotation of said tuning knob to make with each other to complete the energizing circuit for said relay winding, said relay winding being responsive to an output signal from said phase detector when the energizing circuit for the relay winding is completed to become energized to disconnect said inductive loop sense antenna from said automatic direction finder receiver, to connect said capacitive sense antenna to said automatic direction finder receiver in lieu thereof, and to connect said phase shifting means into the automatic direction finder receiver.

9. An automatic direction finder receiver in accordance with claim 8 comprising a holding circuit for said relay winding, said relay winding remaining energized until a null position is reached by said goniometer and said output signal decreases below a predetermined minimum value.

References Cited in the file of this patent
UNITED STATES PATENTS 2,917,742  Hemphill et al. _____ Dec. 15, 1959